(12) United States Patent
Nishida

(10) Patent No.: US 10,550,285 B2
(45) Date of Patent: Feb. 4, 2020

(54) METHOD FOR MANUFACTURING TELESCOPIC SHAFT

(71) Applicant: JTEKT CORPORATION, Osaka-shi, Osaka (JP)

(72) Inventor: Tomoya Nishida, Kashihara (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 15/032,468

(22) PCT Filed: Nov. 10, 2014

(86) PCT No.: PCT/JP2014/079674
§ 371 (c)(1),
(2) Date: Apr. 27, 2016

(87) PCT Pub. No.: WO2015/068831
PCT Pub. Date: May 14, 2015

(65) Prior Publication Data
US 2016/0257850 A1 Sep. 8, 2016

(30) Foreign Application Priority Data

Nov. 11, 2013 (JP) .................................. 2013-233143

(51) Int. Cl.
*B05D 1/22* (2006.01)
*C09D 177/00* (2006.01)
*C09D 5/03* (2006.01)

(52) U.S. Cl.
CPC ............ *C09D 177/00* (2013.01); *B05D 1/22* (2013.01); *C09D 5/03* (2013.01)

(58) Field of Classification Search
CPC ................ B05D 1/22; F16D 3/06; C09D 5/03
See application file for complete search history.

(56) References Cited

U.S. PATENT DOCUMENTS

2003/0113475 A1 6/2003 Kitahata et al.
2004/0234702 A1 11/2004 Kitahata et al.
(Continued)

FOREIGN PATENT DOCUMENTS

JP     H07-328127 A    12/1995
JP     2000-108223 A    4/2000
(Continued)

OTHER PUBLICATIONS

Feb. 3, 2015 International Search Report issued in International Patent Application No. PCT/JP2014/079674.
(Continued)

*Primary Examiner* — Robert A Vetere
(74) *Attorney, Agent, or Firm* — Oliff PLC

(57) ABSTRACT

A method for manufacturing a telescopic shaft including a male shaft and a cylindrical female shaft slidably connected to each other in an axial direction, in which an outer circumferential surface of the male shaft or an inner circumferential surface of the female shaft is coated with a resin coating layer, includes a coating step, a broaching step, and a cooling step. In the coating step, a powder coating material is attached, by a fluid bed dip method, on the outer circumferential surface of the male shaft or the inner circumferential surface of the female shaft which is heated in advance and the resin coating layer is formed. In the broaching step, the resin coating layer is caused to be thin by broaching before cooling of the formed powder coating material is completed. In the cooling step, the thin resin coating layer is cooled.

4 Claims, 6 Drawing Sheets

(56) References Cited

U.S. PATENT DOCUMENTS

| | | | |
|---|---|---|---|
| 2006/0134344 A1 | 6/2006 | Kitahata et al. | |
| 2007/0149422 A1 | 6/2007 | Miyajima et al. | |
| 2011/0030496 A1* | 2/2011 | Tokioka ................. | F16C 3/035 |
| | | | 74/492 |
| 2014/0059832 A1 | 3/2014 | Tokiaka | |

FOREIGN PATENT DOCUMENTS

| | | | | |
|---|---|---|---|---|
| JP | 2002-263951 A | 9/2002 | | |
| JP | 2002-273284 A | 9/2002 | | |
| JP | 2003-155135 A | 5/2003 | | |
| JP | 2005-066598 A | 3/2005 | | |
| JP | 4566909 B2 | 10/2010 | | |
| JP | 2011-173464 A | 9/2011 | | |
| JP | 2011-174607 A * | 9/2011 | ............... | F16D 3/06 |
| JP | 2011-174607 A | 9/2011 | | |
| JP | 5104001 B2 | 12/2012 | | |
| WO | 2012/128213 A1 | 9/2012 | | |

OTHER PUBLICATIONS

Jun. 7, 2017 extended European Search Report issued in European Application No. 14860825.0.
Apr. 18, 2018 Office Action issued in Chinese Patent Application No. 201480061549.X.

* cited by examiner

METHOD FOR MANUFACTURING TELESCOPIC SHAFT

TECHNICAL FIELD

The present invention relates to a method for manufacturing a telescopic shaft used as an intermediate shaft or the like, which includes a male shaft connected to be slidable in an axial direction and a cylindrical female shaft, and which transmits a steering force, for example, in a vehicle steering apparatus.

BACKGROUND ART

An intermediate shaft of a vehicle steering apparatus is configured of a telescopic shaft in which, for example, a male shaft and a cylindrical female shaft are telescopically connected in an axial direction by splines in mesh (spline fitting). In some cases, the outer circumferential surface of the male shaft or the inner circumferential surface of the female shaft, which has splines, is coated with a resin coating layer with which a clearance between both the shafts is filled so as to reduce rattling or to reduce loosening of a steering wheel during a steering operation (for example, see PTLs 1 and 2).

As a method for forming the resin coating layer, a powder-fluidized bed dip method is known. Since an organic solvent is not used in the powder-fluidized bed dip method, it is advantageous to reduce the impact on the environment.

In the powder-fluidized bed dip method, a powder coating material containing a base resin (thermoplastic resin) as a base of the resin coating layer is first prepared, and the powder coating material enters a state of being suspended or fluidized in a fluid bath by blowing air or the like therein.

Subsequently, when the male shaft or the female shaft heated to have a temperature equal to or above the melting point of the base resin is dipped in the suspended or fluidized powder coating material, the powder coating material is attached to the outer circumferential surface of the male shaft or the inner circumferential surface of the female shaft (hereinafter, in some cases, also referred to as an "attachment target surface") and is melted and spread, and then, is further cooled and solidified such that a resin coating layer is formed.

As the base resin as the base of the resin coating layer formed from the powder coating material, polyamide 11, polyamide 12, or the like, which can form a resin coating layer good in fluidity when melting and good in slidability or the like, is appropriately used.

CITATION LIST

Patent Literature

[PTL 1] Japanese Patent No. 5104001
[PTL 2] Japanese Patent No. 4566909

SUMMARY OF INVENTION

Technical Problem

In recent years, there is a demand that an intermediate shaft provided in an automobile interior can also be provided in a high-temperature engine room or the like. Therefore, a resin coating layer needs to have high heat-resistance.

Hence, it is studied to use, as the base resin, polyamide 610 or the like which is better in heat resistance than current materials, and is also good in friction and wear properties, slidability, or the like.

However, problems arise in that, since polyamide 610 has high viscosity when melting, and has low throwing power after attachment, polyamide 610 is not smoothly spread by melting and it is not easy to form a continuous resin coating layer.

In order to solve the problems, it is considered that two or more dips of the heated male shaft or the female shaft are repeatedly performed in the suspended or fluidized powder coating material, unlike the only one dip in the related art so as to increase the attachment amount of the powder coating material, that is, to obtain a large thickness of the powder coating material, such that a continuous resin coating layer is formed.

However, in this case, a problem arises in that vacuum voids are likely to be formed in the resin coating layer.

In other words, since a surface of the resin coating layer is rapidly cooled by being in contact with outside air after being formed, but the temperature of the heated male shaft or female shaft is unlikely to be lowered, an inner section of the resin coating layer is in a continuous high-temperature melting state closer to the attachment target surface.

Therefore, the resin coating layer is solidified, thereby contracting in series from the surface, and, particularly, a region having a low density is locally formed in a thick portion, near an interface of the attachment target surface. Then, when the density of the region is lower than a limit, a vacuum void is formed.

The thick resin coating layer is cooled and then, is finished by broaching or the like in accordance with the clearance between the male shaft and the female shaft; however, when the vacuum void is formed in the inner section, the void is exposed as a defect during polishing and results in reducing strength or the like of the resin coating layer.

An object of the present invention is to provide a manufacturing method in which a telescopic shaft having a continuous resin coating layer without a vacuum void, which is formed on an outer circumferential surface of a male shaft or an inner circumferential surface of a female shaft, can be manufactured by a powder-fluidized bed dip method using a powder coating material.

Solution to Problem

According to an advantageous aspect of the present invention, there is provided a method for manufacturing a telescopic shaft including a male shaft and a cylindrical female shaft slidably connected to each other in an axial direction thereof, in which an outer circumferential surface of the male shaft or an inner circumferential surface of the female shaft is coated with a resin coating layer, the method including: a coating step of attaching, by a fluid bed dip method, a powder coating material on the outer circumferential surface of the male shaft or the inner circumferential surface of the female shaft which is heated in advance and of forming the resin coating layer; a broaching step of making the resin coating layer thin by broaching before cooling of the formed resin coating layer is completed; and a cooling step of cooling the thin resin coating layer.

In the broaching step, the resin coating layer may be subjected to the broaching in a temperature which is equal to or higher than a temperature below a melting point of the base resin contained in the powder coating material by 30° C. and is equal to or lower than the melting point.

In the coating step, the resin coating layer may be formed to have a thickness of 100 μm to 1.5 mm.

BRIEF DESCRIPTION OF DRAWINGS

FIG. 5A is a sectional view showing a state in which a resin coating layer is formed in a coating step, and FIG. 5B is a sectional view showing a state in which broaching is performed on the resin coating layer in a broaching step.

DESCRIPTION OF EMBODIMENTS

Figure 1:
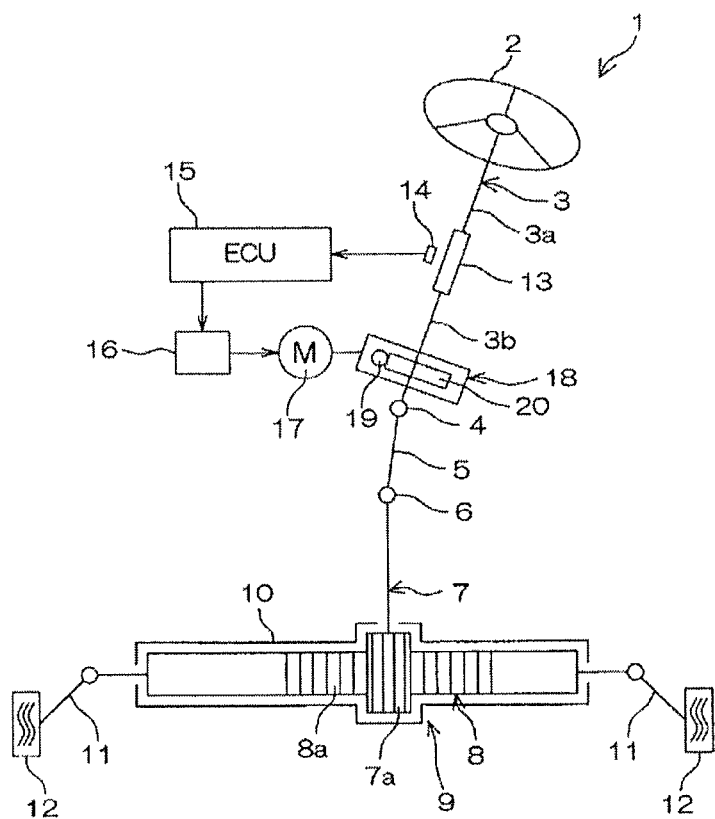
FIG. 1 is a view schematically showing an example of an electric power steering apparatus including an intermediate shaft which is assembled as a telescopic shaft.

FIG. 1 is a view schematically showing an example of an electric power steering apparatus including an intermediate shaft which is assembled as a telescopic shaft.

With reference to FIG. 1, an electric power steering apparatus 1 includes a steering shaft 3 that is connected to a steering wheel 2 so as to be integrally rotatable along with the steering wheel, an intermediate shaft 5 connected to the steering shaft 3 through a universal joint 4, a pinion shaft 7 connected to the intermediate shaft 5 through a universal joint 6, and a rack bar 8, as a steering shaft, which has rack teeth 8a which mesh with pinion teeth 7a provided on the pinion shaft 7, and which extends in a rightward-leftward direction of an automobile.

A steering mechanism 9 formed by a rack and pinion mechanism is configured to include the pinion shaft 7 and the rack bar 8.

The rack bar 8 is supported in a rack housing 10 fixed to a vehicle body, in a straightly reciprocating manner through a plurality of bearings (not shown). Both ends of the rack bar 8 project toward both sides of the rack housing 10 and tie rods 11 are connected to the ends, respectively.

Each tie rod 11 is connected to a corresponding steering tire 12 through a knuckle arm (not shown).

When the steering shaft 3 is rotated by an operation of the steering wheel 2, the pinion teeth 7a and the rack teeth 8a convert the rotation thereof into a linear movement of the rack bar 8 in the rightward-leftward direction of the automobile such that steering of the steering tire 12 is achieved.

The steering shaft 3 is divided into an input shaft 3a connected to the steering wheel 2, and an output shaft 3b connected to the pinion shaft 7, and both shafts 3a and 3b are connected to have the same axial line through a torsion bar 13 in a relatively rotatable manner from each other.

In addition, the torsion bar 13 is provided with a torque sensor 14 for detecting steering torque obtained by relative rotational displacement between both shafts 3a and 3b, and the torque detection results of the torque sensor 14 are transmitted to an electronic control unit (ECU) 15.

The ECU 15 controls driving of a steering assisting electric motor 17 through a driver circuit 16 in response to the torque detection results, vehicle speed detection results transmitted from a vehicle speed sensor (not shown), or the like. Output rotation speed of the electric motor 17 is reduced through a speed reducer 18, is transmitted to the pinion shaft 7, and is converted into a straight movement of the rack bar 8 such that the steering is assisted.

The speed reducer 18 includes a pinion 19, as an input shaft, which is rotated and driven by the electric motor 17, and a main wheel 20 that is meshed with the pinion 19 and that is connected to be integrally rotatable along with the output shaft 3b of the steering shaft 3.

Figure 2:
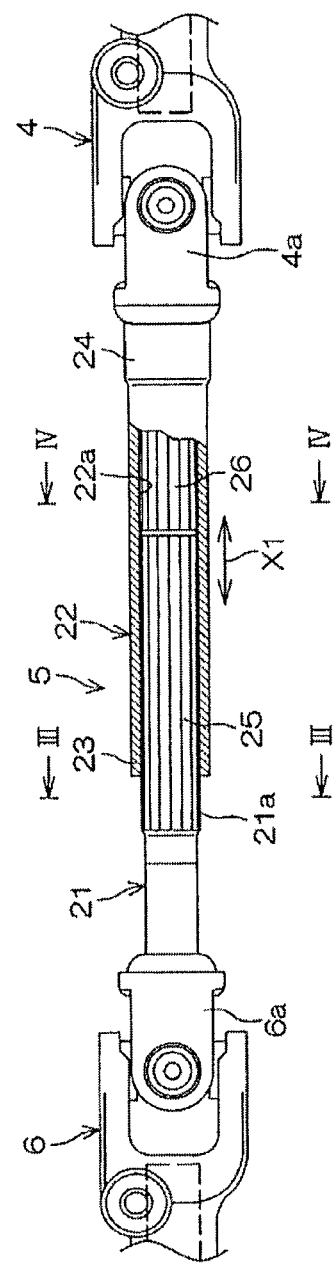
FIG. 2 is a sectional view of main parts of the intermediate shaft.

FIG. 2 is a sectional view of main parts of the intermediate shaft.

With reference to FIGS. 1 and 2, the intermediate shaft 5 includes a male shaft 21, for example, as a lower shaft, and a cylindrical female shaft 22, for example, as an upper shaft.

An upper end of the female shaft 22 is connected to a yoke 4a of the universal joint 4, and a lower end of the male shaft 21 is connected to a yoke 6a of the universal joint 6.

The female shaft 22 has a first end 23 as an open end, and a second end 24 as a closed end. The second end 24 is connected to the end of the yoke 4a of the universal joint 4 and is closed.

The male shaft 21 is inserted into the female shaft 22 from the first end 23 side, and is connected to be slidable in the axial direction X1. Specifically, the male shaft 21 and the female shaft 22 are connected by spline fitting.

Figure 3:
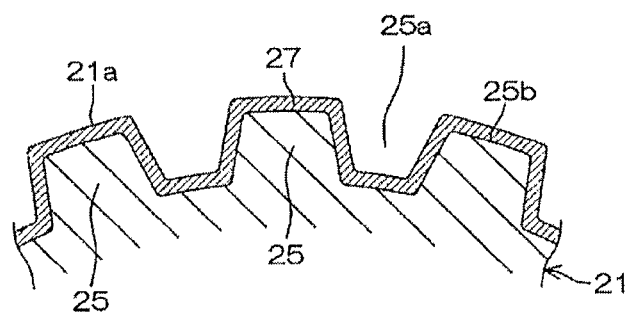
FIG. 3 is a sectional view taken along line III-Ill in FIG. 2.
Figure 4:
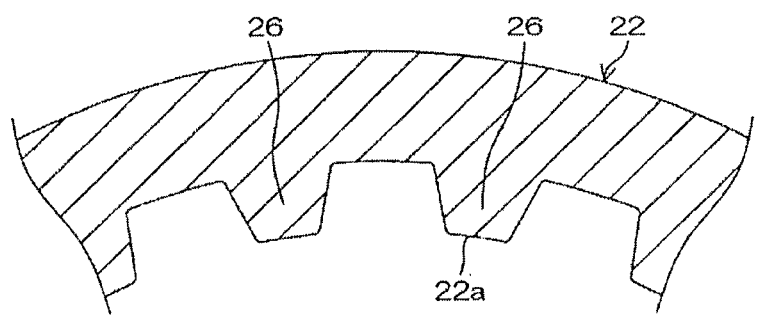
FIG. 4 is a sectional view taken along line IV-IV in FIG. 2.

FIG. 3 is a sectional view taken along line III-Ill in FIG. 2. In addition, FIG. 4 is a sectional view taken along line IV-IV in FIG. 2.

With reference to FIGS. 2 and 3, an outer circumferential surface 21a of the male shaft 21 has male splines 25 parallel to the axial direction X1. With reference to FIGS. 2 and 4, an inner circumferential surface 22a of the female shaft 22 has female splines 26 that are parallel to the axial direction X1 and meshed with the male splines 25.

The meshing, that is, the spline fitting, of the male splines 25 and the female splines 26 enables the male shaft 21 and the female shaft 22 to relatively slide in the axial direction X1 and to integrally rotate.

With reference to FIG. 3, the outer circumferential surface 21a of the male shaft 21 having male splines 25 is coated with a resin coating layer 27.

Such a resin coating layer 27 is provided, thereby applying predetermined sliding resistance between the male shaft 21 and the female shaft 22 and a clearance between both shafts 21 and 22 is filled thereby such that it is possible to reduce rattling or to have minor rattling of the steering wheel 2 during a steering operation.

The intermediate shaft 5, as the telescopic shaft, in which the male shaft 21 has the outer circumferential surface 21a having male splines 25 which is coated with the resin coating layer 27, can be manufactured by the manufacturing method of the present invention through the coating step, a broaching step, and a cooling step, described above.

Figure 5A:
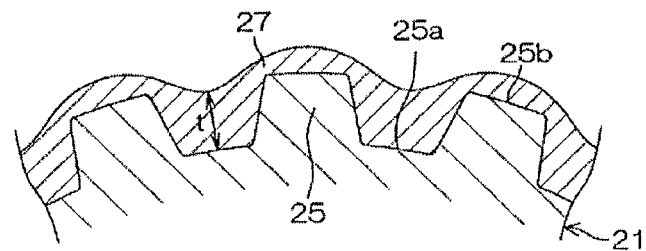
FIGS. 5A and 5B are views showing steps in an example of a manufacturing method of the present invention.
Figure 5B:
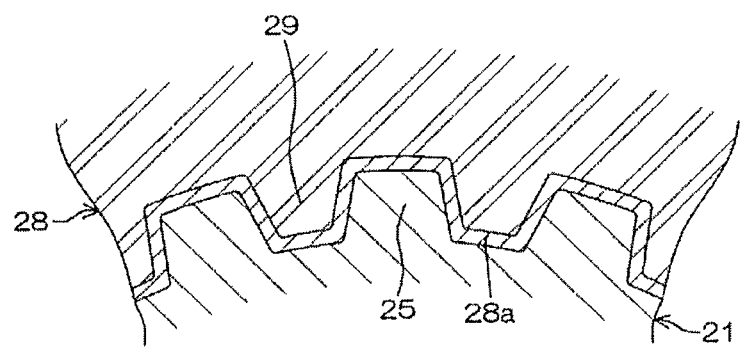

FIGS. 5A and 5B are views showing steps in an example of the manufacturing method of the present invention. FIG. 5A is a sectional view showing a state in which the resin coating layer is formed in the coating step, and FIG. 5B is a sectional view showing a state in which broaching is performed in the broaching step.

First, in the coating step, the powder coating material as a base material of the resin coating layer 27 enters a state of being suspended or fluidized in a fluid bath by blowing air or the like therein. Subsequently, the male shaft 21 heated to a temperature equal to or above the melting point of the base resin contained in the powder coating material is dipped into the suspended and fluidized powder coating material.

In this manner, the powder coating material is attached to the outer circumferential surface 21a of the male shaft 21, and is melted and spread such that the resin coating layer 27 is formed (refer to FIG. 5A).

In this stage, it is preferable that, as shown in FIG. 5A, the powder coating material forms a thick layer such that the resin coating layer 27 is formed to be as continuous as possible. In this manner, for example, polyamide 610 or the like has high viscosity when melting, and has low throwing power after the attachment. Therefore, even in a case where a powder coating material containing a base resin which is not smoothly spread by melting, the continuous resin coating layer 27 can be formed on the outer circumferential surface 21a.

As the base resin, in addition to polyamide 610 described above, various types of thermoplastic resins can be used as a powder coating material for powder coating, such as engineering plastic or super engineering plastics, such as polyamide 612, polyphenylene sulfide (PPS), polyether ether ketone (PEEK), amorphous polyarylate (PAR), polysulfone (PSF), polyether sulfone (PES), polyimide, polyetherimide (PEI), liquid crystal polymer (LCD), or fluorine resin.

Particularly, as described above, it is preferable that polyamide 610 is used as the base resin, in regard of obtaining the resin coating layer 27 having high heat resistance so as to endure, for example, the use in an engine room.

There is no particular limitation on thickness of the resin coating layer 27 in the coating step; however, it is preferable that a thickness t of a tooth groove 25a between the male splines 25 is equal to or greater than 100 μm, and preferably equal to or smaller than 1.5 mm.

The resin coating layer 27 formed in the coating step before performing the broaching has the thickness t less than the range, and particularly, polyamide 610 or the like has the high viscosity when melting and has low throwing power after the attachment. Therefore, when the powder coating material containing the base resin, which is not smoothly spread by melting, is used, there is a concern that it is not possible to form the resin coating layer 27 continuously from the inside of the tooth groove 25a to a tooth tip 25b of the male splines 25.

In addition, there is a concern that the rattling is likely to occur due to the elastic modulus of the resin coating layer 27 by cooling, and the clearance set between the male shaft 21 and the female shaft 22; however, the rattling occurs when the resin coating layer formed through the broaching step to the cooling step has too small a thickness or when it is not possible to sufficiently fill the clearance described above.

In comparison, in a case where the thickness t exceeds the range, there is a concern that a difference in temperature in a thickness direction will become significant in the thick resin coating layer 27 before performing broaching, particularly, in the resin coating layer 27 in the tooth groove 25a, and vacuum voids will be formed.

In contrast, the thickness t is within the range described above and thereby, it is possible to have a thickness appropriate to fill the clearance set between the male shaft 21 and the female shaft 22 and it is possible to further efficiently form the resin coating layer 27 continuous from the inside of the tooth groove 25a to the tooth tip 25b of the male spline 25 without a vacuum void.

Next, in the broaching step, the resin coating layer 27 is caused to be thin by the broaching before the cooling of the formed resin coating layer 27 is completed.

Specifically, for example, with reference to FIG. 5B, the male shaft 21, on which the resin coating layer 27 formed in the previous coating step is not completely cooled, and is caused to pass through a broach 28 prepared in advance, thereby causing the resin coating layer 27 to be subjected to the broaching and to become thin.

The broach 28 has an cylindrical inner circumferential surface 28a with a plurality of teeth 29 that have a cross-sectional shape similar to the female splines 26 of the female shaft 22 and are parallel and meshed with the tooth groove 25a between the male splines 25 of the male shaft 21, and the teeth 29 are formed to have a cross-sectional shape and a dimension with a clearance separated between the male splines 25 by the thickness of the resin coating layer 27 after the broaching and before the cooling.

In a state in which the central axis of the male shaft 21 is coincident with that of the broach 28, and the tooth groove 25a of the male shaft 21 is coincident with the tooth 29 of the broach 28, in phase, the male shaft 21 is caused to pass through the broach 28, and thereby, the resin coating layer 27 is subjected to the broaching and becomes thin.

According to the present invention, in a state in which the resin coating layer formed in the coating step before completing the cooling, has sufficiently decreased thickness through the broaching step, it is possible to perform the cooling in the following cooling step. Therefore, it is possible to significantly reduce the temperature difference in the thickness direction in the resin coating layer 27 in the cooling step and it is possible to reduce vacuum voids, compared to the related art in which cooling is performed on the original thickness without being reduced and the broaching is performed after the cooling is completed.

In addition, since the resin coating layer 27 becomes thin in the broaching step, and then is cooled, it is advantageous that, in such a resin coating layer 27, a period of time of cooling the male shaft 21 coated with the resin coating layer 27 is shortened, compared to the related art, and it is possible to enhance productivity of the intermediate shaft 5 as the telescopic shaft.

A timing of performing the broaching may be appropriate as long as the broaching is performed before the cooling of the resin coating layer 27 formed in the coating step described above is completed. However, it is preferable that the resin coating layer 27 is subjected to the broaching at a temperature which is equal to or higher than a temperature below the melting point by 30° C. and is equal to or lower than the melting point of the base resin contained in the powder coating material.

For example, in a case where polyamide 610 having the melting point of 220° C. is used as the base resin, it is preferable that the broaching is performed within a range from 190° C. to 220° C.

Figure 6:
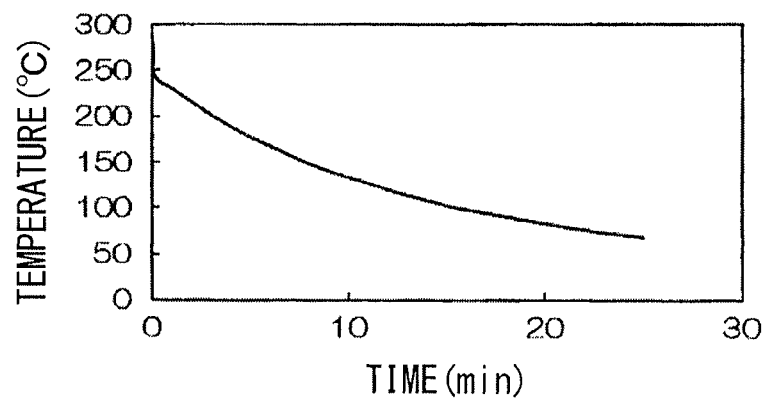
FIG. 6 is a graph showing an example of a change in the temperature (° C.) of the resin coating layer formed in the coating step, due to time elapse from a temperature measured immediately after the coating.
Figure 7:
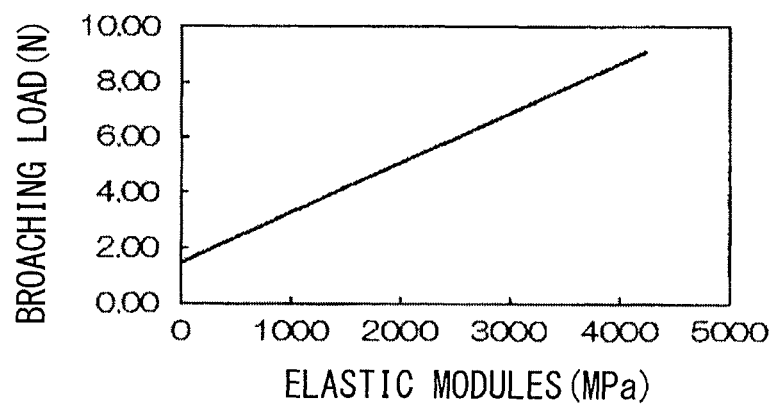
FIG. 7 is a graph showing an example of a relationship between the elastic modulus (MPa) of the base resin and a broaching load (N) of the resin coating layer.

FIG. 6 is a graph showing an example of a change in the temperature (° C.) of the resin coating layer formed in the coating step, due to time elapse from a temperature measured immediately after the coating. FIG. 7 is a graph showing an example of a relationship between the elastic modulus (MPa) of the base resin and a broaching load (N) of the resin coating layer.

With reference to FIG. 6, the temperature of the resin coating layer 27 formed on the outer circumferential surface 21a of the male shaft 21 in the coating step, is gradually lowered after a time point (time point at 0 minutes in FIG. 6) at which the male shaft 21 is pulled out from the fluid bath.

However, the temperature of the heated male shaft 21 is unlikely to be lowered as described above. Therefore, although the broaching is performed after the temperature is lowered to a temperature lower than the temperature below the melting point of the base resin by 30° C., there is a concern that the temperature difference in the thickness direction in the resin coating layer 27 having the thickness obtained before performing the broaching will become significant until then and vacuum voids will be formed.

In addition, with reference to FIG. 7, the lower the temperature of the base resin, the more the elastic modulus (MPa) is increased, and a broaching load (N) of the resin coating layer 27 tends to be increased proportional thereto.

Therefore, in the case where the broaching is performed after the temperature is lowered to a temperature lower than the temperature below the melting point of the base resin by 30° C., the broaching load (N) is significantly increased, and there is a concern that workability of the broaching will be lowered or the hardened resin coating layer 27 will be easily peeled off from the male shaft 21 due to an excessive load.

In comparison, since the resin coating layer 27 does not start to be solidified at a temperature exceeding the melting point, there is a concern that it is not possible to perform the broaching.

It is preferable that the broaching is performed after the resin coating layer 27 starts to be solidified to a certain extent, because the workability of the broaching is enhanced. Therefore, it is preferable that the broaching is performed at a temperature below the melting point of the base resin, at a temperature below the melting point by 5° C., and particularly, at a temperature below the melting point by 10° C.

In the following cooling step, the thin resin coating layer 27 is cooled to room temperature for each male shaft 21, and then the male shaft is combined with the female shaft 22, thereby enabling the intermediate shaft 5 to be manufactured as the telescopic shaft, shown in FIGS. 1 and 2.

The resin coating layer 27 may not be formed on the outer circumferential surface 21a of the male shaft 21, and may be formed on the inner circumferential surface 22a of the female shaft 22. Here, there is no need to form the coating layer on both surface sides.

The steering apparatus including the telescopic shaft assembled as the intermediate shaft 5 is not limited to the column-type electric power steering apparatus shown in FIG. 1, and may be another type of power steering apparatus or a common steering apparatus without a steering assistance function.

The telescopic shaft may be applied to a shaft or the like which can be telescopic so as to secure shock absorbing stroke in the steering apparatus.

Besides, it is possible to perform various types of design modifications within a range without departing from the gist of the present invention.

Hereinafter, the present invention is further described based on Examples and Comparative Examples; however, configurations of the present invention are not limited to the Examples and Comparative Examples.

Example 1

(Coating Step)

The resin coating layer 27 was formed on the outer circumferential surface 21a including the male splines 25 of the male shaft 21 shown in FIGS. 1 to 4, using the powder coating material containing polyamide 610 (the melting point of 220° C.) as the base resin, by the powder-fluidized bed dip method (FIG. 5A).

Conditions were as follows. The temperature of the male shaft 21 was 250° C. and the thickness t of the resin coating layer 27 in the tooth groove 25a between the male splines 25 was 1 mm.

(Broaching Step)

When the temperature was in a range of 190° C. to 220° C. before the cooling of the resin coating layer 27 was completed, the broaching was performed using the broach 28, and the resin coating layer 27 became thin so as to have the thickness t of about 300 µm in the tooth groove 25a between the male splines 25 (FIG. 5B).

(Cooling Step)

The resin coating layer 27 subjected to the broaching was cooled to room temperature for each male shaft 21 and the male shaft 21 was produced in which the outer circumferential surface 21a including the male splines 25 of the male shaft 21 was coated with the resin coating layer 27.

Comparative Example 1

The resin coating layer obtained after the coating step was cooled to room temperature for each male shaft 21, and then the male shaft 21 was produced in which the outer circumferential surface 21a including the male splines 25 of the male shaft 21 was coated with the resin coating layer 27, similar to Example 1 except for the broaching.

<Surface Observation>

Figure 8:
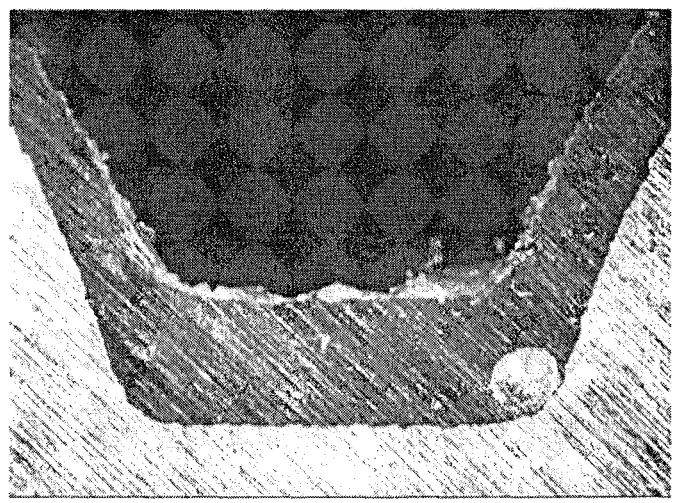
FIG. 8 is a micrograph of a cross-sectional surface of the resin coating layer formed in Comparative Example.
Figure 9:
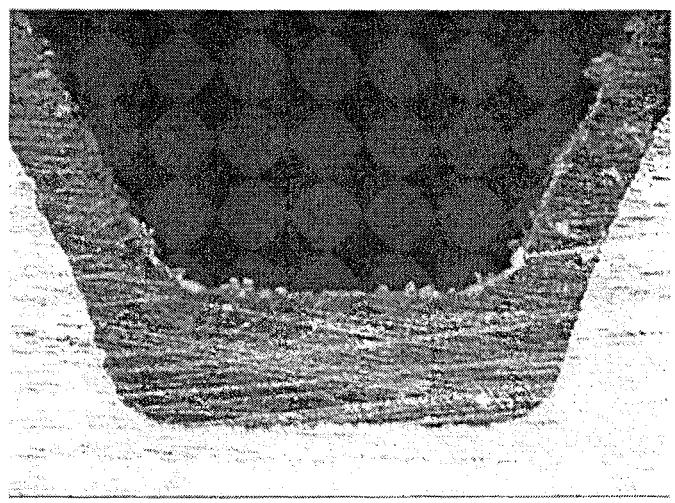
FIG. 9 is a micrograph of a cross-sectional surface of the resin coating layer formed in Example.

In the male shafts 21 produced by Example 1 and Comparative Example 1, a cross-sectional surface cut for each resin coating layer was observed under the telescope and it is verified that the vacuum void was formed in the resin coating layer as shown in FIG. 8, in Comparative Example 1. In comparison, in Example 1, no vacuum void was found in the resin coating layer as shown in FIG. 9.

According to the manufacturing of the present invention in which the broaching step is performed before the cooling of the formed resin coating layer is completed after the coating step, it is verified from the above results that it is possible to form, on the outer circumferential surface of the male shaft, a continuous resin coating layer without a vacuum void by the powder-fluidized bed dip method.

According to the present invention, the resin coating layer formed on the attachment target surface in the coating step is subjected to the broaching in the following broaching step before the cooling thereof is completed and the thickness of the layer is sufficiently reduced, and then the cooling is performed in the cooling step. Therefore, it is possible to significantly reduce the temperature difference in the thickness direction in the resin coating layer in the cooling step and it is possible to reduce vacuum voids, compared to the related art in which cooling is performed on the original thickness without being reduced and the broaching is performed after the cooling is completed.

Therefore, in the coating step, for example, polyamide 610 or the like has high viscosity when melting, and has low throwing power after the attachment. Therefore, even in a case where a thickness of a powder coating material containing a base resin which is not smoothly spread by melting is increased, it is possible to manufacture the telescopic shaft in which the continuous resin coating layer without a vacuum void can be formed to have a predetermined thickness on the attachment target surface through the following broaching step and the cooling step.

In addition, since the resin coating layer becomes thin in the broaching step, and then is cooled, it is advantageous that, in such a resin coating layer, a period of time of cooling the male shaft or the female shaft coated with the resin coating layer is shortened, compared to the related art, and it is possible to enhance productivity of the intermediate shaft.

In the broaching step of the present invention, it is preferable that the resin coating layer is subjected to the broaching at a temperature which is equal to or higher than the temperature below the melting point by 30° C. and is equal to or less than the melting point of the base resin contained in the powder coating material.

As described above, the temperature of the heated male shaft is unlikely to be lowered as described above. Therefore, although the broaching is performed after the temperature is lowered to a temperature lower than the temperature below the melting point of the base resin by 30° C., there is a concern that the temperature difference in the thickness direction in the resin coating layer having the thickness obtained before performing the broaching will become significant until then and vacuum voids will be formed.

In addition, the lower the temperature, the more the elastic modulus of the base resin is increased, and a broaching load in the broaching tends to be increased proportional thereto.

Therefore, in the case where the broaching is performed after the temperature is lowered to a temperature lower than the temperature below the melting point of the base resin by 30° C., the broaching load is significantly increased, and there is a concern that workability of the broaching will be lowered or the hardened resin coating layer will be easily peeled off from the male shaft due to an excessive load.

In comparison, since the resin coating layer does not start to be solidified at a temperature exceeding the melting point, there is a concern that it is not possible to perform the broaching.

In the coating step of the present invention, it is preferable that the resin coating layer is formed to have the thickness of 100 μm to 1.5 mm.

The resin coating layer formed in the coating step before performing the broaching has a thickness of less than 100 μm, and particularly, polyamide 610 or the like has the high viscosity when melting and has low throwing power after the attachment. Therefore, when the powder coating material containing the base resin, which is not smoothly spread by melting, is used, there is a concern that it is not possible to form the continuous resin coating layer continuous.

In addition, there is a concern that the rattling is likely to occur due to the elastic modulus of the resin coating layer by cooling, or the clearance set between the male shaft and the female shaft; however, the rattling occurs when the resin coating layer formed through the broaching step to the cooling step has too small a thickness and thus, it is not possible to sufficiently fill the clearance described above.

In comparison, in the case where the thickness exceeds 1.5 mm, there is a concern that the difference in temperature in the thickness direction will become significant in the thick resin coating layer before performing broaching and vacuum voids will be formed.

INDUSTRIAL APPLICABILITY

According to the present invention, it is possible to manufacture a telescopic shaft having a continuous resin coating layer without a vacuum void, which is formed on an outer circumferential surface of a male shaft or an inner circumferential surface of a female shaft, by a powder-fluidized bed dip method using a powder coating material.

REFERENCE SIGNS LIST

1: electric power steering apparatus
2: steering wheel
3: steering shaft
3a: input shaft
3b: output shaft
4: universal joint
4a: yoke
5: intermediate shaft
6: universal joint
6a: yoke
7: pinion shaft
7a: pinion teeth
8: rack bar
8a: rack teeth
9: steering mechanism
10: rack housing
11: tie rod
12: steering tire
13: torsion bar
14: torque sensor
15: ECU
16: driver circuit
17: electric motor
18: speed reducer
19: pinion
20: main wheel
21: male shaft
21a: outer circumferential surface
22: female shaft
22a: inner circumferential surface
23: first end section
24: second end section
25: male splines
25a: tooth groove
25b: tooth tip
26: female splines
27: resin coating layer
28: broach
28a: inner circumferential surface
29: teeth
X1: axial direction

The invention claimed is:

1. A method for manufacturing a telescopic shaft including a male shaft and a cylindrical female shaft slidably connected to each other in an axial direction thereof, in which an outer circumferential surface of the male shaft or an inner circumferential surface of the female shaft is coated with a resin coating layer, the method comprising:
  a coating step of attaching, by a fluid bed dip method, a powder coating material on the outer circumferential surface of the male shaft which is heated in advance or on the inner circumferential surface of the female shaft which is heated in advance, and of forming the resin coating layer;
  a broaching step of making the resin coating layer thin by broaching with a broach, the broaching step occurring before cooling of the formed resin coating layer from a heated state during the coating step is completed; and
  a cooling step of cooling the thin resin coating layer, wherein the resin coating layer is allowed to cool for the entire period between the coating step and the broaching step, the broaching step is performed with the broach before the male shaft is inserted into the female shaft, and in the broaching step, the resin coating layer is subjected to the broaching at a temperature which is in a range of from equal to or higher than a temperature that is 30° C. below a melting point of the base resin contained in the powder coating material, and equal to or lower than the melting point of the base resin contained in the powder coating material.

2. The method for manufacturing the telescopic shaft according to claim 1, wherein in the coating step, the resin coating layer is formed to have a thickness of 100 μm to 1.5 mm.

3. The method for manufacturing the telescopic shaft according to claim 1, further comprising:

forming a vehicle steering apparatus with the telescopic shaft.

4. The method for manufacturing a telescopic shaft according to claim 1, wherein the broaching step occurs while the resin coating layer is cooling after the coating step.

\* \* \* \* \*